(Model.)
T. C. NORWOOD.
DISTRIBUTING ATTACHMENT FOR PLOWS.
No. 248,782. Patented Oct. 25, 1881.
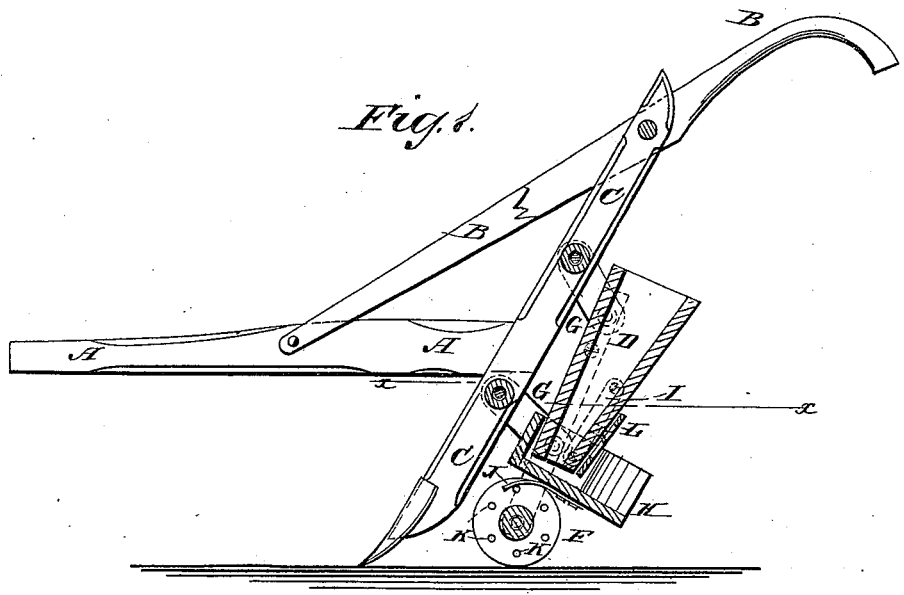
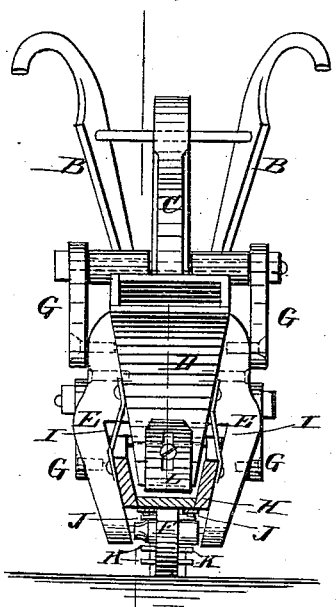
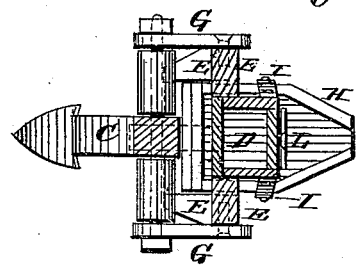
WITNESSES:
INVENTOR:

UNITED STATES PATENT OFFICE.

TIMOTHY C. NORWOOD, OF HONEA PATH, SOUTH CAROLINA, ASSIGNOR TO HIMSELF AND JOHN R. DONALD, OF SAME PLACE.

DISTRIBUTING ATTACHMENT FOR PLOWS.

SPECIFICATION forming part of Letters Patent No. 248,782, dated October 25, 1881.

Application filed December 31, 1880. (Model.)

*To all whom it may concern:*

Be it known that I, TIMOTHY CHANDLER NORWOOD, of Honea Path, in the county of Anderson and State of South Carolina, have invented a new and useful Improvement in Distributing Attachments for Plows, of which the following is a specification.

Figure 1 is a sectional side elevation of my improvement, shown as applied to a plow. Fig. 2 is a rear elevation of the same, the discharge-spout being shown in section. Fig. 3 is a sectional plan view of the same, taken through the line $x\ x$, Fig. 1.

Similar letters of reference indicate corresponding parts.

The object of this invention is to provide the back of the plow-stock with a simple and effective distributing attachment for sowing seeds or fertilizers in the furrow formed by the advance of the plow in the ground.

The invention consists in the peculiar construction and arrangement of a hopper, a shaking spout or shoe at the bottom of the hopper, and an agitating-wheel underneath this spout, when all three parts are carried by two upright bars forming a supporting-frame, which supporting-frame is hung to the rear side of the plow-standard by links, and which supporting-frame preserves the same relation between the hopper, spout, and wheel for all positions of the plow, whether on level ground or in going up or down hill, as hereinafter more fully described.

In the accompanying drawings, A represents the beam, B the handles, and C the standard, of an ordinary plow-stock.

D is the hopper or box to receive the seed or the guano or other fine fertilizer to be sown or distributed.

To the opposite sides of the hopper D are attached two bars, E, the lower ends of which project below the lower end of the hopper D, and to and between the said lower ends is pivoted a small wheel, F, to roll along the bottom of the furrow and support the hopper D.

To the upper and lower part of each side of the hopper D are pivoted the rear ends of two links, G, the forward ends of which are pivoted to the side of the plow-standard C, or to supports attached to or to rods or shafts passed through the said standard. With this construction the hopper D will always be held parallel with the standard C, while being allowed to move up and down freely as the wheel F passes over inequalities in the furrow. The lower end of the hopper D is left open, and beneath the said open end is placed a small spout, H, to the opposite sides of which are attached the lower ends of two leather straps, I, or other flexible connections. The upper ends of the straps I are attached to the opposite sides of the hopper D, so that the soil-spout will be suspended from the said hopper.

To the bottom of the spout H, near its side edges, are attached two arms, J, which are curved or inclined downward, so as to project along the opposite sides of the rear upper part of the wheel F into such position that they will be struck successively by the pins K, passed through the said wheel and projecting upon its opposite sides. With this construction, as the plow is drawn forward the wheel F will roll along the bottom of the furrow and the pins K will successively strike the arms J and agitate the spout H, causing the guano to pass out at the rear end of the said spout.

The amount of guano distributed is regulated by a gage-plate, L, attached to the lower part of the rear side of the hopper D, and which is slotted longitudinally to receive the fastening-screw, so that it can be adjusted lower or higher, to allow less or more guano to pass out, as may be desired.

I have described the attachment as arranged for distributing fertilizers; but the discharge-spout can be provided with an ordinary seed-dropping slide without departing from my invention.

In defining my invention more clearly with respect to other preceding constructions, I would state that I am aware that a hopper has been hung to the rear side of a plow-standard by links and supported upon a roller at one side, as shown in the Patent No. 135,766, and I do not claim this of itself.

I am also aware that a stationary hopper, a movable spout at its lower end, and a subjacent shaking wheel have been arranged in the rear of a plow-standard, as in Patent No. 213,843; and I do not claim this organization as broadly new. I do not know, however, that this hopper, spout, and wheel have ever been connected together by two upright bars, E, which bars are connected to the rear of the plow-standard by links. The merit of these bars in this connection is that they hold the hopper, spout, and agitating-wheel in the same and proper operative relation to each other, whether traveling on a horizontal surface or going up or down hill, allowing them all to rise or fall together.

Having thus described my invention, I claim as new and desire to secure by Letters Patent—

The combination, with the plow-standard, of the hopper D, spout H, and subjacent shaker-wheel F, the bars E, connecting these parts and holding them always in the same operative relation, and the links G G, jointed to the bars E, and also to the plow-standard, for the movement together of said parts in parallel position behind the plow-standard, as described.

TIMOTHY CHANDLER NORWOOD.

Witnesses:
 B. A. MATTISON,
 I. I. SHIRLEY.